(12) United States Patent
Ali Akbarian et al.

(10) Patent No.: US 12,340,624 B2
(45) Date of Patent: Jun. 24, 2025

(54) POSE PREDICTION FOR ARTICULATED OBJECT

(71) Applicant: Microsoft Technology Licensing, LLC, Redmond, WA (US)

(72) Inventors: Mohammad Sadegh Ali Akbarian, Cambridge (GB); Pashmina Jonathan Cameron, Cambridge (GB); Andrew William Fitzgibbon, Cambridge (GB); Thomas Joseph Cashman, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 17/806,718

(22) Filed: Jun. 13, 2022

(65) Prior Publication Data

US 2023/0282031 A1    Sep. 7, 2023

Related U.S. Application Data

(60) Provisional application No. 63/268,904, filed on Mar. 4, 2022.

(51) Int. Cl.
  *G06V 40/20* (2022.01)
  *G06T 7/73* (2017.01)
  *G06V 10/774* (2022.01)

(52) U.S. Cl.
  CPC .............. *G06V 40/23* (2022.01); *G06T 7/73* (2017.01); *G06V 10/774* (2022.01); *G06V 40/28* (2022.01)

(58) Field of Classification Search
  CPC ...... G06V 40/23; G06V 40/28; G06V 10/774; G06V 40/10; G06V 40/20; G06V 10/82;
  (Continued)

(56) References Cited

U.S. PATENT DOCUMENTS 10,657,696 B2     5/2020   Jin et al.
10,860,091 B2 *  12/2020   Erivantcev ............ G06F 3/0346
(Continued)

FOREIGN PATENT DOCUMENTS

JP         7506446 B1 *    6/2024
WO      2020060666 A1     3/2020
WO   WO-2024166600 A1 *   8/2024

OTHER PUBLICATIONS

Muhammad; Saif Ullah Khan et al. , "Continual Human Pose Estimation for Incremental Integration of Keypoints and Pose Variations", Cornell University, Sep. 30, 2024 (Year: 2024).*
(Continued)

*Primary Examiner* — John Villecco
*Assistant Examiner* — Alejandro Hernandez
(74) *Attorney, Agent, or Firm* — Alleman Hall & Tuttle LLP

(57) ABSTRACT

A method for predicting the pose of an articulated object includes receiving spatial information for n joints of the articulated object. The spatial information for the n joints is passed to a machine learning model previously trained to receive spatial information for n+m joints as input, wherein $m \geq 1$. From the machine learning model, a pose prediction for the articulated object is received as output based at least on the spatial information for the n joints, and without spatial information for the m joints.

20 Claims, 9 Drawing Sheets

(58) Field of Classification Search
CPC .. G06T 7/73; G06T 13/40; G06T 7/70; G06T 19/006; G06T 7/20; G06T 7/246; G06T 17/00; G06F 3/017; G06F 3/011; G06F 3/014; G06F 3/01

See application file for complete search history.

(56) References Cited

U.S. PATENT DOCUMENTS

| | | | |
|---|---|---|---|
| 11,042,028 | B1 | 6/2021 | Welch et al. |
| 11,482,048 | B1* | 10/2022 | Diaz-Arias .......... G16H 30/40 |
| 12,087,094 | B2* | 9/2024 | Comeau ............... G06V 40/23 |
| 12,216,815 | B2* | 2/2025 | Lefaudeux ............ G06N 5/04 |
| 2016/0085310 | A1* | 3/2016 | Shotton ................ G06F 18/24 382/103 |
| 2018/0024635 | A1* | 1/2018 | Kaifosh ................ G06F 3/017 345/156 |
| 2018/0122098 | A1* | 5/2018 | Wang ..................... G06T 7/75 |
| 2019/0171871 | A1* | 6/2019 | Zhang ................. G06V 40/103 |
| 2019/0227627 | A1* | 7/2019 | Kaifosh .............. A61B 5/1128 |
| 2019/0228533 | A1* | 7/2019 | Giurgica-Tiron ....... G06F 3/015 |
| 2019/0272670 | A1 | 9/2019 | Tagliasacchi et al. |
| 2020/0012922 | A1* | 1/2020 | Tanabe ................. G06V 40/10 |
| 2020/0160535 | A1* | 5/2020 | Ali Akbarian ......... G06N 5/046 |
| 2020/0250874 | A1* | 8/2020 | Assouline ............ G06T 19/006 |
| 2020/0311977 | A1* | 10/2020 | Wood ..................... G06T 7/75 |
| 2020/0334828 | A1* | 10/2020 | Öztireli ................ G06N 20/00 |
| 2021/0150228 | A1* | 5/2021 | Goforth ................ G06T 7/73 |
| 2021/0209788 | A1* | 7/2021 | Kim ..................... G06T 7/73 |
| 2024/0257382 | A1* | 8/2024 | Hewitt ................. G06T 7/70 |
| 2024/0296582 | A1* | 9/2024 | Ramani ................ G06V 10/44 |
| 2025/0022202 | A1* | 1/2025 | Guay .................... G06N 3/09 |

OTHER PUBLICATIONS

Ningrum; Endah et al. "An Improved Performance of Convolutional Neural Network for Infant Pose Estimation by Evaluating Hyperparameter", IEEE, Aug. 23, 2023 (Year: 2023).*

"International Search Report and Written Opinion issued in PCT Application No. PCT/US2022/051120", Mailed Date: Mar. 15, 2023, 13 Pages.

Ahuja, et al., "CoolMoves: User Motion Accentuation in Virtual Reality", In Proceedings of the ACM on Interactive, Mobile, Wearable and Ubiquitous Technologies, vol. 5, Issue 2, Jun. 24, 2021, 23 Pages.

Aliakbarian, et al., "A Stochastic Conditioning Scheme for Diverse Human Motion Prediction", In Proceedings of the IEEE/CVF Conference on Computer Vision and Pattern Recognition, Jun. 13, 2020, pp. 5223-5232.

Aliakbarian, et al., "Contextually Plausible and Diverse 3D Human Motion Prediction", In Proceedings of the IEEE/CVF International Conference on Computer Vision, Oct. 11, 2021, pp. 11333-11342.

Aliakbarian, et al., "FLAG: Flow-based 3D Avatar Generation from Sparse Observations", In repository of arXiv:2203.05789v1, Mar. 11, 2022, 10 Pages.

Biggs, et al., "3D Multi-bodies: Fitting Sets of Plausible 3D Human Models to Ambiguous Image Data", In Repository of arXiv:2011.00980v1, Nov. 2, 2020, 14 Pages.

Bogo, et al., "Keep It SMPL: Automatic Estimation of 3D Human Pose and Shape from a Single Image", In Proceedings of 14th European Conference on Computer Vision, Oct. 11, 2016, pp. 561-578.

Bommasani, et al., "On the Opportunities and Risks of Foundation Models", In Repository of arXiv:2108.07258v1, Aug. 16, 2021, 211 Pages.

Choutas, et al., "Learning to Fit Morphable Models", In Repository of arXiv:2111.14824v1, Nov. 29, 2021, 14 Pages.

Dinh, et al., "Density Estimation using Real NVP", In Repository of arXiv:1605.08803v1, May 27, 2016, 29 Pages.

Dittadi, et al., "Full-Body Motion from a Single Head-Mounted Device: Generating SMPL Poses from Partial Observations", In Proceedings of the IEEE/CVF International Conference on Computer Vision (ICCV), Oct. 11, 2021, pp. 11687-11697.

Han, et al., "MEgATrack: Monochrome Egocentric Articulated Hand-Tracking for Virtual Reality", In Journal of ACM Transactions on Graphics (TOG), vol. 39, Issue 4, Jul. 8, 2020, 13 Pages.

Jang, et al., "Categorical Reparameterization with Gumbel-Softmax", In Repository of arXiv:1611.01144v1, Nov. 3, 2016, 13 Pages.

Jiang, et al., "Real-time Full-body Motion Reconstruction and Recognition for Off-the-Shelf VR Devices", In Proceedings of the 15th ACM SIGGRAPH Conference on Virtual-Reality Continuum and Its Applications in Industry—vol. 1, Dec. 3, 2016, pp. 309-318.

Kanazawa, et al., "End-to-end Recovery of Human Shape and Pose", In Proceedings of the IEEE Conference on Computer Vision and Pattern Recognition (CVPR), Jun. 18, 2018, pp. 7122-7131.

Kingma, et al., "Auto-Encoding Variational Bayes", In Repository of arXiv:1312.6114v1, Dec. 20, 2013, 9 Pages.

Kolotouros, et al., "Learning to Reconstruct 3D Human Pose and Shape via Model-fitting in the Loop", In Proceedings of the IEEE/CVF International Conference on Computer Vision, Oct. 27, 2019, pp. 2252-2261.

Kolotouros, et al., "Probabilistic Modeling for Human Mesh Recovery", In Proceedings of the IEEE/CVF International Conference on Computer Vision, Oct. 11, 2021, pp. 11605-11614.

Lin, et al., "Temporal IK: Data-Driven Pose Estimation for Virtual Reality", In a Technical Report Submitted to University of California at Berkeley, May 17, 2019, 33 Pages.

Ling, et al., "Character Controllers using Motion VAEs", In Journal of ACM Transactions on Graphics (TOG), vol. 39, Issue 4, Jul. 8, 2020, 12 Pages.

Loper, et al., "SMPL: A Skinned Multi-Person Linear Mode", In Journal of ACM Transactions on Graphics (TOG), vol. 34, Issue 6, Nov. 2, 2015, 16 Pages.

Mahmood, et al., "AMASS: Archive of Motion Capture as Surface Shapes", In Proceedings of the IEEE/CVF International Conference on Computer Vision, Oct. 27, 2019, pp. 5442-5451.

Osman, et al., "STAR: Sparse Trained Articulated Human Body Regressor", In Proceedings of the 16th European Conference, Part VI, Aug. 23, 2020, 17 Pages.

Pavlakos, et al., "Expressive Body Capture: 3D Hands, Face, and Body from a Single Image", In Proceedings of the IEEE/CVF Conference on Computer Vision and Pattern Recognition, Jun. 16, 2019, pp. 10975-10985.

Rempe, et al., "Contact and Human Dynamics from Monocular Video", In Proceedings of the 16th European Conference on Computer Vision, Aug. 23, 2020, 27 Pages.

Rempe, et al., "HuMoR: 3D Human Motion Model for Robust Pose Estimation", In Proceedings of the International Conference on Computer Vision, May 12, 2021, 25 Pages.

Rezende, et al., "Variational Inference with Normalizing Flows", In Proceedings of the 32nd International Conference on Machine Learning, Jul. 6, 2015, 9 Pages.

Richard, et al., "MeshTalk: 3D Face Animation from Speech using Cross-Modality Disentanglement", In Repository of arXiv:2104.08223v1, Apr. 16, 2021, 10 Pages.

Saito, et al., "PIFuHD: Multi-Level Pixel-Aligned Implicit Function for High-Resolution 3D Human Digitization", In Proceedings of the IEEE/CVF Conference on Computer Vision and Pattern Recognition (CVPR), Jun. 13, 2020, pp. 84-93.

Saleh, et al., "Probabilistic Tracklet Scoring and Inpainting for Multiple Object Tracking", In Proceedings of the IEEE/CVF Conference on Computer Vision and Pattern Recognition (CVPR), Jun. 19, 2021, pp. 14329-14339.

Sengupta, et al., "Probabilistic 3D Human Shape and Pose Estimation from Multiple Unconstrained Images in the Wild", In Proceedings of the IEEE/CVF Conference on Computer Vision and Pattern Recognition (CVPR), Jun. 19, 2021, pp. 16094-16104.

Sharma, et al., "Monocular 3D Human Pose Estimation by Generation and Ordinal Ranking", In Proceedings of the IEEE/CVF Conference on Computer Vision (ICCV), Oct. 27, 2019, pp. 2325-2334.

(56) References Cited

OTHER PUBLICATIONS

Sigal, et al., "HUMANEVA: Synchronized Video and Motion Capture Dataset and Baseline Algorithm for Evaluation of Articulated Human Motion", In International Journal of Computer Vision, Jul. 27, 2009, 30 Pages.

Sohn, et al., "Learning Structured Output Representation using Deep Conditional Generative Models", In Journal of Advances in Neural Information Processing Systems, vol. 28, Dec. 7, 2015, 9 Pages.

Taylor, et al., "Efficient and Precise Interactive Hand Tracking Through Joint, Continuous Optimization of Pose and Correspondences", In Journal of ACM Transactions on Graphics (TOG), vol. 35, Issue 4, Article 143, Jul. 24, 2016, 12 Pages.

Tome, et al., "SelfPose: 3D Egocentric Pose Estimation from a Headset Mounted Camera", In Repository of arXiv:2011.01519v1, Nov. 2, 2020, 13 Pages.

Walter, Rudin, "Real and Complex Analysis", In Publication of McGraw-Hill International Editions, Jan. 1987, 433 Pages.

Yang, et al., "LoBSTr: Real-time Lower-body Pose Prediction from Sparse Upper-body Tracking Signals", In Repository of arXiv:2103.01500v2, Jun. 15, 2021, 11 Pages.

Zanfir, et al., "Neural Descent for Visual 3D Human Pose and Shape", In Proceedings of the IEEE/CVF Conference on Computer Vision and Pattern Recognition (CVPR), Jun. 19, 2021, pp. 14484-14493.

Zanfir, et al., "Weakly Supervised 3D Human Pose and Shape Reconstruction with Normalizing Flows", In Proceedings of 16th European Conference on Computer Vision, Aug. 23, 2020, 17 Pages.

Zhang, et al., "We are More than Our Joints: Predicting how 3D Bodies Move", In Proceedings of the IEEE/CVF Conference on Computer Vision and Pattern Recognition (CVPR), Jun. 19, 2021, pp. 3372-3382.

Zhou, et al., "On the Continuity of Rotation Representations in Neural Networks", In Proceedings of the IEEE/CVF Conference on Computer Vision and Pattern Recognition, Jun. 16, 2019, pp. 5745-5753.

Zuo, et al., "SparseFusion: Dynamic Human Avatar Modeling from Sparse RGBD Images", In Repository of arXiv:2006.03630v1, Jun. 5, 2020, 14 Pages.

\* cited by examiner

POSE PREDICTION FOR ARTICULATED OBJECT

CROSS REFERENCE TO RELATED APPLICATIONS

This application claims priority to U.S. Provisional Patent Application Ser. No. 63/268,904, filed Mar. 4, 2022, the entirety of which is hereby incorporated herein by reference for all purposes.

BACKGROUND

Information regarding the "pose" of an articulated object (e.g., the positions and orientations of one or more body parts of a human user) may be mapped onto a virtual articulated representation that is rendered for display. For example, when a human user is participating in a virtual environment as part of a virtual reality experience, their representation within the virtual environment may be rendered with a pose that appears similar to the user's real-world pose.

However, accurately representing the real-world pose of a human user (or other suitable articulated object) with a virtual representation often requires relatively detailed information regarding the positions/orientations of the user's body parts, and such information is not always available. For example, when a head-mounted display device is used to provide a virtual reality experience, the display device may only receive spatial information pertaining to a user's head and optionally hands. In many cases this is insufficient to accurately recreate the real-world pose of the human user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for predicting the pose of an articulated object includes receiving spatial information for n joints of the articulated object. The spatial information for the n joints is passed to a machine learning model previously trained to receive spatial information for n+m joints as input, wherein m>=1. From the machine learning model, a pose prediction for the articulated object is received as output based at least on the spatial information for the n joints, and without spatial information for the m joints.

DETAILED DESCRIPTION

It is sometimes desirable to display a virtual articulated representation with a pose that appears similar to the real-world pose of an articulated object. For example, the present disclosure primarily focuses on scenarios where the articulated object is a human user. The user may be represented in a virtual environment by a virtual representation that appears to have the same pose as the human user's real-world pose—e.g., as part of a virtual reality experience, such as a video game or teleconference session. Accurately recreating the user's real-world pose in the virtual environment can improve the immersion of the virtual reality experience both for the human user and any other users they are interacting with.

Figure 1:
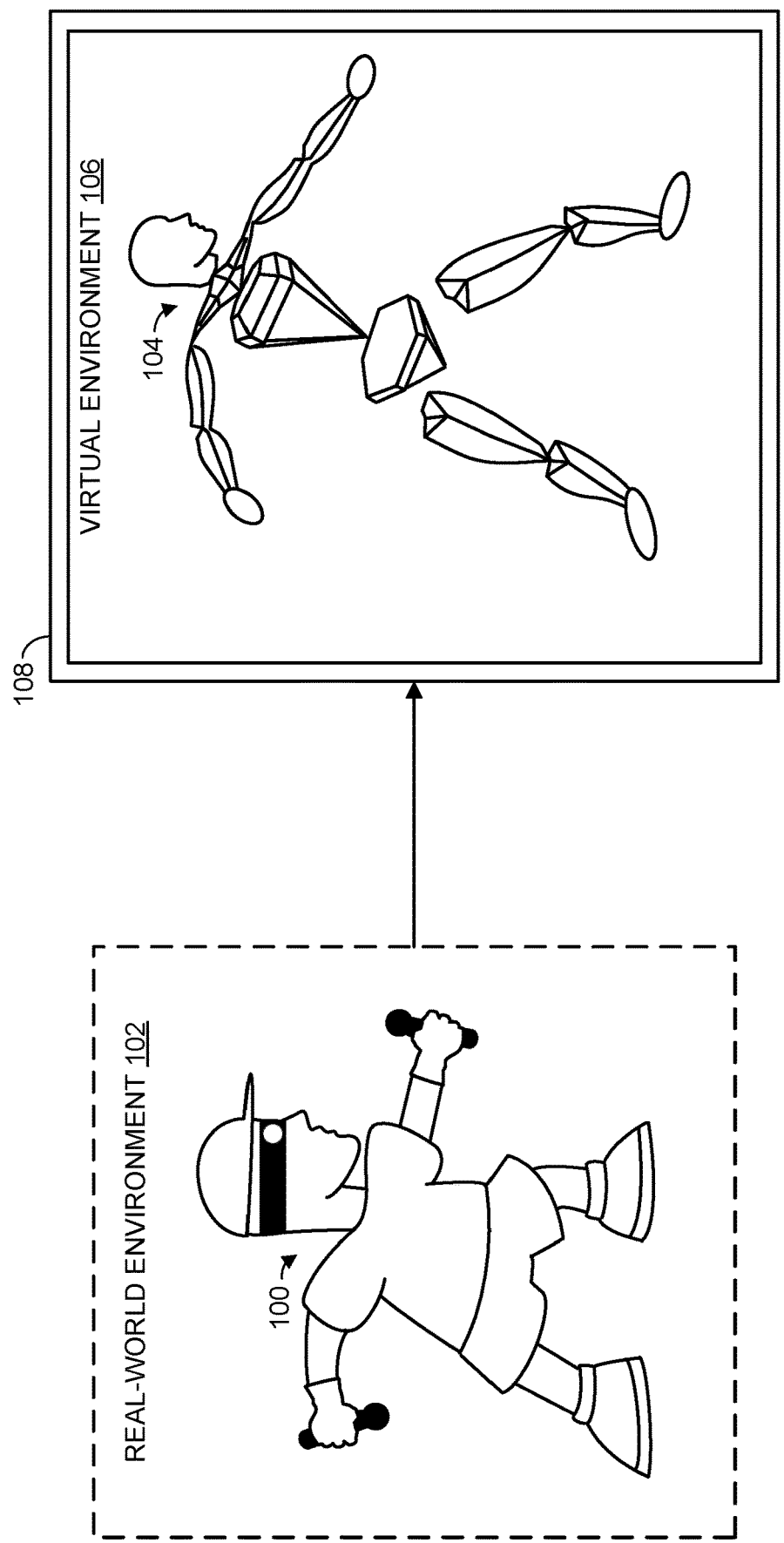
FIG. 1 schematically illustrates an articulated object taking the form of a human user represented in a virtual environment as a virtual representation.

This is schematically illustrated with respect to FIG. 1, showing a human user 100 in a real-world environment 102. As shown, the pose of the human user is applied to an articulated representation 104 that virtually represents the human user in a virtual environment 106. In other words, as the human user moves parts of his body in the real-world environment, the user's movements are translated into corresponding movements of articulated representation 104 in virtual environment 106. For example, the articulated representation may be an avatar of human user 100 in a virtual reality video game, teleconference, and/or other virtual reality experience.

In FIG. 1, the articulated representation 104 and virtual environment 106 are presented on an electronic display device 108. The electronic display device may have any suitable form factor and utilize any suitable underlying display technology. For example, the electronic display device may be a near-eye display device (e.g., integrated into a head-mounted display), a television, computer monitor, smartphone, tablet, laptop display, projector system, etc.

It will be understood that the present disclosure is not limited to scenarios where the articulated object is the full body of a human user. Rather, in another example that will be described below, the articulated object may take the form of a hand of a human user, or any other substituent part of a human body. Additionally, or alternatively, an "articulated object" can include non-human objects such animals, or inanimate objects such as machines. In general, an "articulated object" can take the form of any structure that includes multiple different parts coupled to one another via multiple joints, enabling the position and/or orientation of one or more moveable parts of the articulated object to be changed relative to the rest of the articulated object.

Furthermore, it will be understood that the predicted pose output for an articulated object need not be graphically rendered for display—e.g., as part of a virtual reality experience or otherwise. Rather, in some cases, the predicted pose of the articulated object may be used for other purposes that do not involve displaying any representation of a real-world articulated object. As one non-limiting example, the predicted pose of the articulated object may be used for gesture recognition—e.g., a human user may control a computing system by performing various predefined gestures (e.g., waving their hand, swinging their arm), and performance of these gestures may be detected based on the predicted pose output for the human user via the techniques described herein.

A computing device attempting to map the pose of an articulated object onto a virtual representation may only have limited information as to the positions/orientations of the parts of the articulated object in the real world. For example, when a human user is using a head-mounted display device, the device may only have spatial information regarding the user's head (e.g., via position sensors integrated into the display device), and one, both, or neither of the user's hands (e.g., via position sensors integrated into handheld controllers, and/or via images captured by one or more suitable cameras). In other words, the computing system only has information regarding a relatively small number of joints of the articulated object (e.g., a human's head and wrist joints), and this can make it difficult to correctly predict the orientations of other joints of the articulated object (e.g., a human's shoulders, torso, and lower body). This can compromise the accuracy of the pose predicted by the computing system—e.g., causing the human user to be represented in the virtual environment with a virtual pose that is inconsistent with their real-world pose.

Accordingly, the present disclosure is directed to techniques for predicting the pose of an articulated object. In particular, a machine learning model receives spatial information for n different joints of the articulated object, where the n joints are less than all joints of the articulated object. For example, in the case of a human user, the n joints may include a head joint and/or one or both wrist joints of the human user, associated with spatial information that details parameters for the user's head and/or hands.

The machine learning model is previously trained to receive as input spatial information for n+m joints of the articulated object, where m is greater than or equal to 1. For example, during initial training, the machine learning model may receive input data corresponding to substantially all joints of the articulated object—e.g., the n+m joints may include every joint of the articulated object. In other examples, however, the n+m joints may include fewer than all joints of the articulated object. During training, the input data provided to the machine learning model may be progressively masked—e.g., input data corresponding to some of the m joints may be replaced with pre-defined values representing masked joints, or simply omitted. In other words, the machine learning model is trained to accurately predict the pose of the articulated object based on progressively less information regarding the positions/orientations of the various moveable parts of the articulated object.

In this manner, the machine learning model may accurately predict the pose of the articulated object at runtime based on sparse inputs—e.g., based at least on spatial information for the n joints, without spatial information for the m joints. In other words, the machine learning model outputs a prediction of the current pose of the articulated object (e.g., a human user in the real world), where the pose prediction may take any suitable form—e.g., a listing of joint rotation values, the predicted positions/orientations of various parts of the articulated object, and/or another form depending on how the pose prediction will be used.

The techniques herein may beneficially allow for accurate recreation of the real-world pose of an articulated object, such as a human user, without requiring extensive information regarding the orientations of every joint of the articulated object. In other words, the techniques described herein may provide a technical benefit of improving human computer interaction by more accurately recreating a human user's real-world pose. This can, for example, improve the immersion of a virtual reality experience that the user is participating in, and/or improve the accuracy of a gesture recognition system. The techniques described herein may provide the technical benefit of reducing consumption of computing resources while accurately recreating a human user's real-world pose, by reducing the amount of data that must be collected as input for the pose prediction process. Furthermore, the techniques herein are associated with specific mathematical operations that provide the technical purpose of predicting the pose of an articulated object based on sparse input data.

In particular, the present disclosure describes an approach for pose prediction based on conditional normalizing flows for sparse inputs. Specifically, the conditional distribution for a full body pose of a human subject can be estimated given the head and optionally hand data via a flow-based model, which enables an invertible mapping between the three-dimensional pose distribution and the base distribution. Invertibility of the model then provides for learning a probabilistic mapping from the conditional distribution to a high-likelihood region in the same base distribution. This may be referred to as a flow-based avatar generative model (FLAG). The strengths of this design may include: first, using a flow-based generative model can enable exact pose likelihood computation, in contrast to the approximate likelihoods seen in other approaches. Second, the invertibility of using a generative model can allow for computation of the oracle latent code. During training, the oracle latent code may then act as the ground truth for a mapping function. This can enable learning a representative mapping from the observed head and optionally hands of the human subject to the latent space, allowing the herein-described techniques to serve as a strong predictive model. Finally, when optimizing either in pose space or latent space, using the predictive model as the pose prior can provide a superior initialization in the latent space, improving optimization efficiency.

Figure 2:
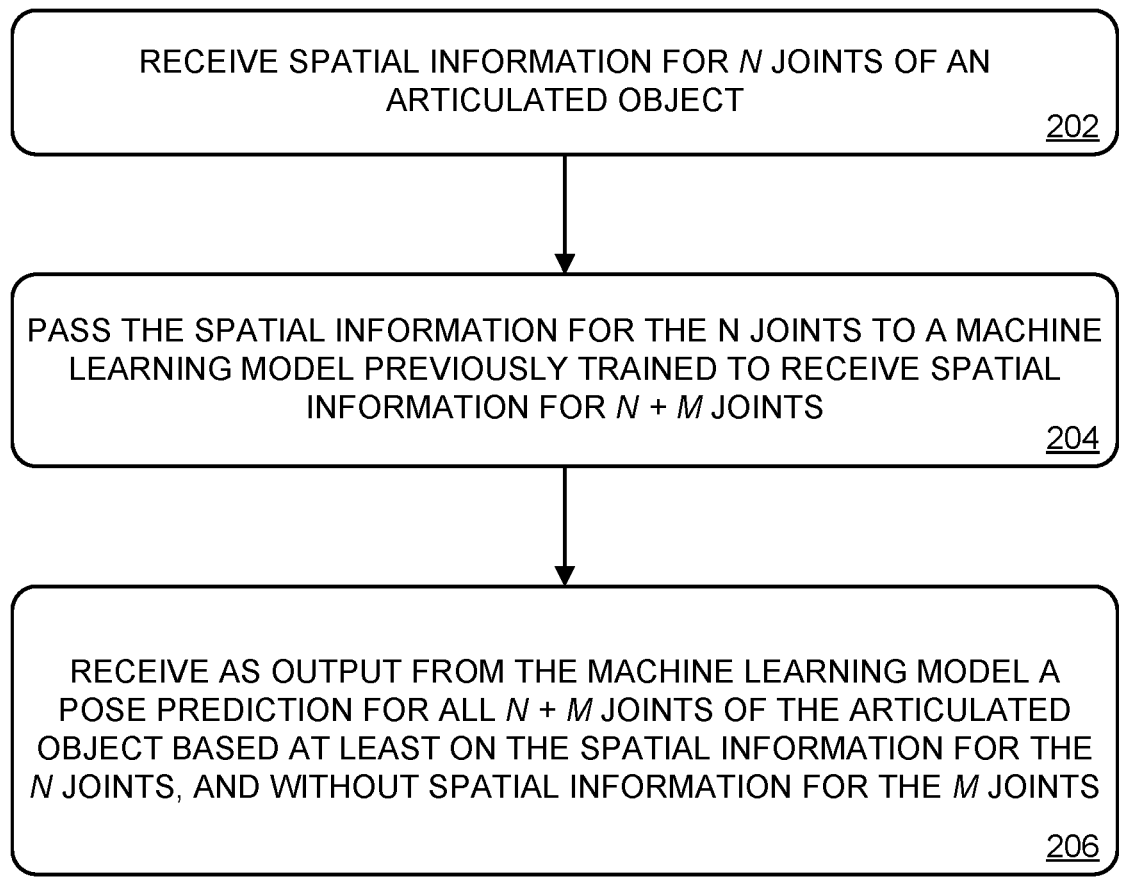
FIG. 2 illustrates an example method for predicting the pose of an articulated object.

FIG. 2 illustrates an example method 200 for predicting the pose of an articulated object. Method 200 may be implemented by any suitable computing system of one or more computing devices. Any computing devices implementing method 200 may each have any suitable capabilities, form factors, and hardware configurations. In cases where two or more different devices implement steps of method 200, they may in some cases communicate over a suitable computer network—e.g., using a client/server model. Method 200 may in some cases be implemented by computing system 800 described below with respect to FIG. 8.

At 202, method 200 includes receiving spatial information for n joints of an articulated object. As discussed above, an "articulated object" can take the form of any structure that includes multiple different parts coupled to one another via multiple joints, enabling the position and/or orientation of one or more moveable parts of the articulated object to be changed. In particular, the articulated object may be the body of a human user.

The system receives spatial information for n joints of the articulated object, which include fewer than all joints of the articulated object. As used herein, "spatial information" may include any suitable computer data that specifies, or is useable to estimate, the position and/or orientation of a part of an articulated object in a real-world environment—e.g., a body part of a human. This can be expressed relative to a joint connected to the articulated part—e.g., the spatial information for a joint is expressed as one or more rotations applied to the joint relative to one or more rotational axes—which is useable to infer the status of a body part connected to the joint. Additionally, or alternatively, the spatial information may be expressed relative to a body part connected to a joint—e.g., the spatial information for a joint is expressed as a six degree-of-freedom (6-DOF) position and orientation of the connected body part—which is useable to infer the status of the joint. As one example, the n joints may include a head joint of a human body, and the spatial information for the head joint may detail parameters for a head of the human body. Additionally, or alternatively, the n joints may include one or more wrist joints of the human body, and the spatial information for the one or more wrist joints may detail parameters for one or more hands of the human body. Furthermore, it will be understood that a "joint" need not refer to an actual anatomical joint of the articulated object. Rather, in some cases, a "joint" may refer to a virtual joint having spatial information that reflects the position/orientation/rotation of a body part of the underlying object, which may be influenced by one or more anatomical joints having different positions relative to the articulated object.

This is schematically illustrated with respect to FIG. 3, again showing human user 100. The human user has a head 300 and two hands 302A and 302B. A computing system may receive spatial information for one or more joints of human user 100 (e.g., spatial information for n joints, where the human body includes more than n joints), which may include head and/or wrist joints enabling movement of the head 300 and/or hands 302A/B.

The spatial information for the n joints of the articulated object may be derived from positioning data output by one or more sensors. These sensors may be integrated into one or more devices that are held by or worn on a corresponding body part of a human user. For example, the sensors may include one or more inertial measurement units (IMUs) integrated into a head-mounted display device and/or handheld controllers. As another example, the sensors may include one or more cameras configured to image portions of the real-world environment in which parts of the articulated object (e.g., the user's hands) are visible.

As used herein, spatial information details "parameters" for one or more parts of the articulated object—e.g., body parts of a human. This means that the spatial information includes information that specifies, or can be used to derive, the position and/or orientation of a part of the articulated object, which is determined by the orientations (e.g., expressed as one or more rotations) of one or more joints of the articulated object. For example, in a case where a human hand is visible in an image captured by a camera, the image data may in some cases be processed to estimate the position and orientation of the human hand relative to a real-world environment, and/or relative to the camera or another frame of reference, as influenced by a wrist joint that the human hand is connected to. As such, in this case, the spatial information is derived from the output of the sensor (e.g., the camera), and the "parameter" detailed by the spatial information is the position/orientation estimate for the human hand, and/or the rotation of the wrist joint.

As another example, however, "spatial information" may refer to the raw output of one or more sensors—e.g., the system may predict the pose of the articulated object based at least in part on the raw output of the sensors. For instance, the system may receive image data from the camera as an input, and may be previously-trained to output a predicted pose based at least in part on the image pixel data. Thus, the "parameters" detailed by the spatial information include the pixels depicting the human hand, which are useable to estimate the position and orientation of the hand, and/or the rotation of the wrist joint.

Figure 3:
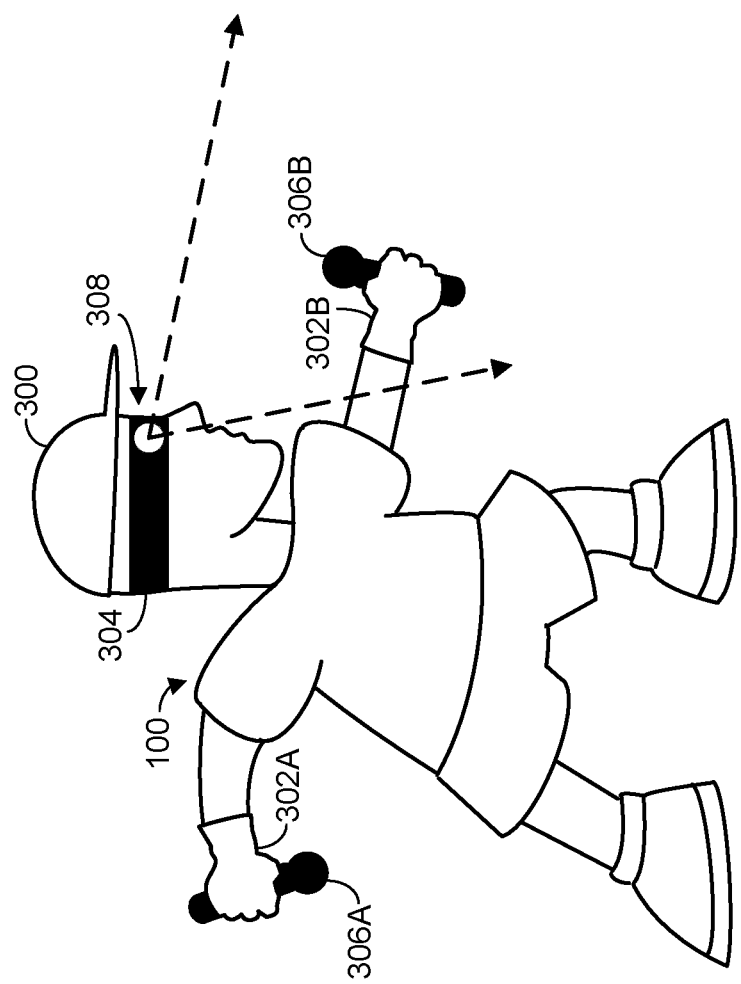
FIG. 3 schematically illustrates sensors used to output spatial information for joints of a human body.

FIG. 3 schematically illustrates different types of sensors, where output from the sensors may include or be useable to derive the spatial information. Specifically, in FIG. 3, human user 100 is wearing a head-mounted display device (HMD) 304 on their head 300, where HMD 304 may be configured to perform one or more steps of method 200. The HMD may, for instance, include an IMU configured to detect changes in position and/or orientation of the HMD (e.g., via a suitable combination of accelerometers, gyroscopes, and/or magnetometers). As such, a change in the position/orientation detected by an IMU integrated into the HMD may be interpreted as a change in position/orientation of the user's head, and thus a change in rotation of the head joint—e.g., spatial information for the head joint can be derived from the output of the HMD's integrated IMU.

Furthermore, in FIG. 3, human user 100 is holding position sensors 306A and 306B, which may be configured to detect and report movements of the user's hands to HMD 304, and/or to another computing system configured to receive the spatial information. The position sensors may, for example, include respective IMUS, and/or other suitable position sensors for detecting movements of the user's hands and/or rotations of the user's wrists.

In some cases, spatial information may include or be derived from the output of wearable position sensors in addition to or instead of handheld position sensors 306A and 306B. For example, the user may wear one or more hand-worn or wrist-worn devices (e.g., rings, watches) configured to output suitable spatial information pertaining to the movements of the user's hands and/or rotations of the user's wrists.

As another example, the spatial information may include or be derived from the output of a camera configured to image the one or more parts of the articulated object. For example, in FIG. 3, HMD 304 includes an on-board camera 308, represented by a white circle. The arrows extending away from the white circle represent the field-of-view (FOV) of the camera within the real-world environment. As such, in the scenario depicted in FIG. 3, human hand 302B will be visible in images of the real-world environment captured by camera 308. The computing system may be configured to recognize pixels of the hand in the captured images (e.g., via a suitable machine-learning trained estimator configured to identify human hands in image data), and estimate a position of the hand based on the size and position of the hand within the captured image. Alternatively, as discussed above, output from the camera may be provided directly to a machine learning model configured to output pose predictions based at least in part on input taking the form of image data.

It will be understood that, at any given time, either, both, or neither of the user's hands may be visible in the FOV of camera 308. Thus, the number of different joints for which spatial information is received may in some cases be variable over time—e.g., at some points, spatial information is received for two wrist joints, and at other points, spatial information is received for neither wrist joint.

Furthermore, in some cases, output from camera 308 may be useable to detect changes in the position and/or orientation of the camera, and thereby the head of the human user (in cases where the camera is integrated into an HMD worn on the user's head). For example, the computing system may recognize one or more landmarks in images of the real-world environment captured by camera 308. As the position and/or orientation of the camera changes, the image-space sizes and/or positions of the recognized landmarks will change. By detecting and analyzing such changes, the movements of the camera (and thereby the user's head) may be estimated, which can be useable to infer rotations of the head joint.

In some cases, camera 308 may be implemented as a depth camera. For example, the camera may be configured to emit patterns of structured light, or calculate the time-of-flight of a photon leaving a light emitter, reflecting off an object in the environment, and striking an image sensor of the camera. This may enable the camera to detect the positions of the body parts of the human user relative to the camera and/or surrounding environment more accurately. The camera may be sensitive to any suitable wavelengths of light—e.g., visible light and/or infrared light.

It will be understood that the specific sensors described above are non-limiting and need not all be used together. For example, one implementation may receive, or derive spatial information from, output from an IMU and camera integrated into an HMD, without using any wearable/hand-held position sensors. In other words, the one or more sensors may include one or both of a camera configured to image body parts of a human body, and a position sensor configured to be held by or worn on at least one body part of the human body (and/or parts of another suitable articulated object). Furthermore, it will be understood that spatial information may be received or derived from the output of one or more sensors not explicitly described herein. Rather, the present disclosure generally assumes that suitable spatial information is received, and is agnostic as to the specific origin and processing that may be applied to such spatial information.

Returning briefly to FIG. 2, at 204, method 200 includes passing the spatial information for the n joints to a machine learning model previously trained to receive spatial information for n+m joints as input, wherein m>=1. In other words, the machine learning model receives spatial information for fewer joints (e.g., n joints) than the machine learning model was previously trained to receive (e.g., n+m joints). At 206, method 200 includes receiving as output from the machine learning model a pose prediction for the articulated object based at least on the spatial information for the n joints, and without spatial information for them joints. In other words, the machine learning model predicts the full pose of the articulated object, even though it is not provided with spatial information for the m joints.

Figure 4:
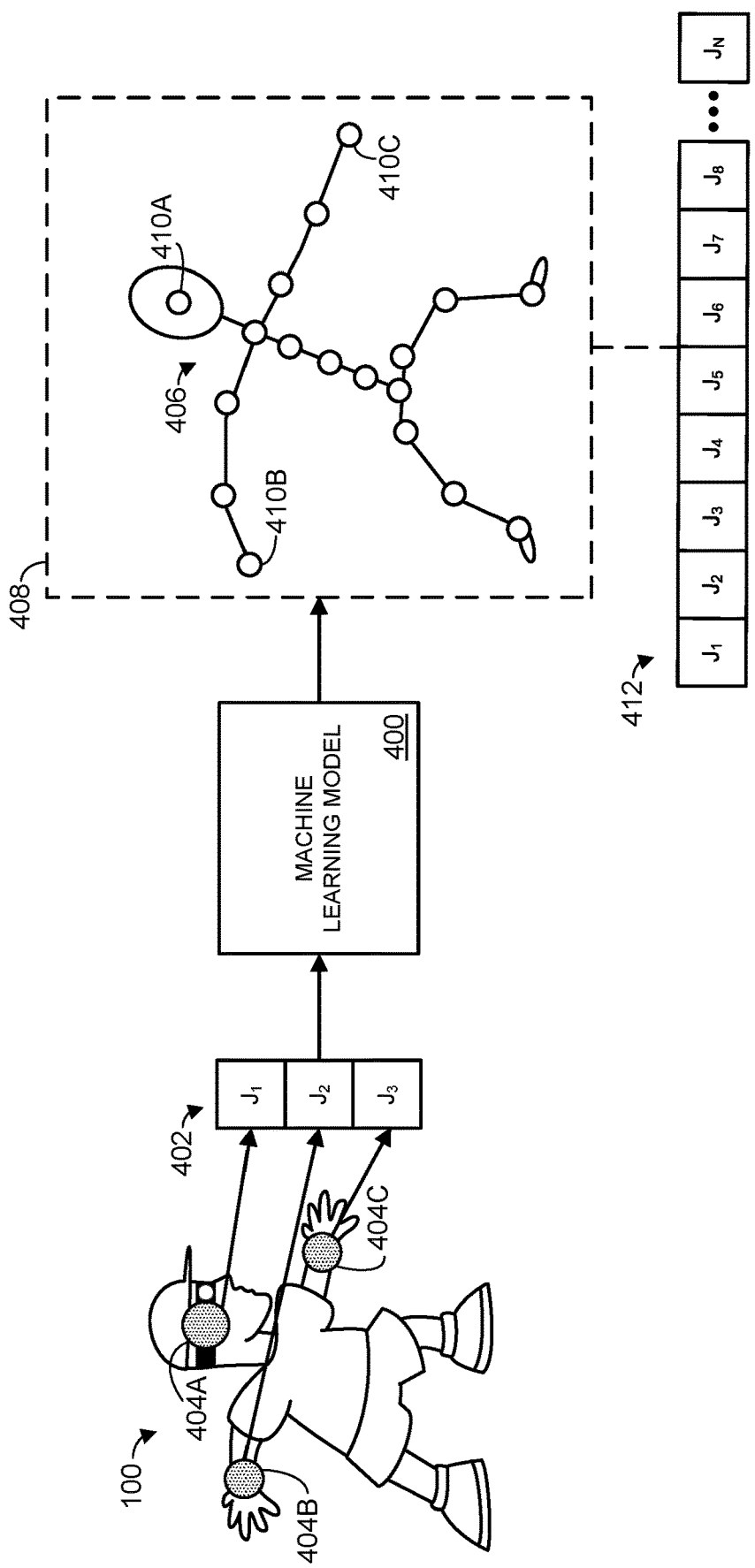
FIG. 4 schematically illustrates a machine learning model outputting a predicted pose for an example articulated object based on spatial information.

This process is schematically illustrated with respect to FIG. 4, showing an example machine learning model 400. Training and operation of the machine learning model will be described in more detail below. In general, the machine learning model may be implemented via any suitable machine learning (ML) and/or artificial intelligence (AI) techniques. Examples of suitable ML and/or AI techniques are described below with respect to FIG. 8.

In FIG. 4, the machine learning model receives spatial information 402, corresponding to three different joints $J_1$, $J_2$, and $J_3$. As discussed above, the spatial information for a joint may take the form of any suitable computer data that specifies or is useable to derive the position and/or orientation of a body part connected to the joint. As examples, the spatial information may directly specify the position and orientation of the body part (e.g., a 6-DOF pose of the body part), and/or the spatial information may specify one or more rotations of the joint relative to one or more rotational axes.

In FIG. 4, the joints $J_1$, $J_2$, and $J_3$ correspond to a head joint 404A and two wrist joints 404B/404C of human user 100, as indicated by the shaded circles superimposed on the body of the human user.

In this example, the n joints include three joints, corresponding to head and wrist joints of a human body. However, it will be understood that this is non-limiting, and that the n joints may include any suitable number of joints of an articulated object, fewer than all of the joints of the articulated object. In some cases, the n joints may include only one joint. Furthermore, in some cases, the number of joints included in the n joints may be variable over time. For example, as discussed above, a user's hands may in some cases be tracked via a camera integrated into a head-mounted display device. At different moments, one, both, or neither of a user's hands may be visible in the camera's field-of-view. Thus, the number of joints included in the n joints may in some cases depend on which of the user's hands are visible in the camera field-of-view, as one example. In general, the machine learning model may receive spatial information corresponding to any number of joints ranging from one joint (e.g., only a human user's head) to every joint of the articulated object, when such information is available. In some cases, the n+m joints may include every joint of the articulated object, or may include fewer than all joints of the articulated object.

Based on the input spatial information 402, the machine learning model outputs a predicted pose 406 for the articulated object. For the sake of illustration, the predicted pose is shown as if applied to a simplified representation 408 of a human body. The simplified representation includes a plurality of joints represented by white circles, some of which are labeled as joints 410A, 410B, and 410C. These may, for instance, correspond directly to head and head joints 404A-C of human user 100.

It will be understood, however, that the predicted pose output by the machine learning model may be expressed in any suitable way. In general, the predicted pose takes the form of a suitable computer data structure useable to recreate, imitate, or otherwise conceptualize the real-world pose of the articulated object, as predicted based on the input data provided to the machine-learning model. As one example, the predicted pose may include a listing of joint rotations for a set of joints. This set of joints may correspond directly to the joints of the articulated object. In one example, the machine learning model may output predicted spatial information for a set of output joints that corresponds to all n+m joints of the articulated object. For instance, in FIG. 4, the machine learning model outputs predicted spatial information 412 for a set of joints $J_1$-$J_N$. These may correspond to the n joints for which input spatial information was provided to the machine learning model, as well as the m joints for which the machine learning model was previously trained.

Additionally, or alternatively, the machine learning model may output predicted spatial information corresponding to joints of a virtual articulated representation that will be rendered for display, which may have a different number and/or distribution of joints from the articulated object—e.g., a human user may be represented by a virtual avatar with cartoonish or non-human proportions. As one example, the predicted spatial information may correspond to joints of a skinned multi-person linear model (SMPL) representation. In other words, a joint of a virtual representation of the articulated representation (e.g., simplified representation 408) need not have a 1:1 correspondence with joints of the articulated object. Thus, the predicted spatial information output by the machine learning model may be for joints that do not directly correspond to the n+m joints of the articulated object. For example, the virtual representation may have fewer spinal joints than the articulated object.

Furthermore, it will be understood that the predicted pose may be expressed in ways other than as a set of joint rotations. For instance, the predicted pose may be specified relative to body parts—e.g., positions and orientations of one or more parts of the articulated object, or one or more parts of a virtual avatar that will be displayed as a representation of the virtual object.

The machine learning model may be trained in any suitable way. In some examples, the machine learning model may be previously trained with training input data having ground truth labels for the articulated object. In other words, the machine learning model may be provided with training spatial information for joints of the articulated object, labeled with ground truth labels that specify the actual pose of the articulated object that the spatial information corresponds to. Non-limiting examples of suitable training procedures will be described below with respect to FIG. 8.

As discussed above, the machine learning model may be trained to receive spatial information for n+m joints as input. This may include, for a first training iteration, providing training input data for all n+m joints to the machine learning model. Over a series of subsequent training iterations, the training input data for the m joints may be progressively masked. For instance, on a second training iteration, a first joint of the m joints may be masked, where spatial information for the joint in the training data set is replaced with a predefined value representing a masked joint, or simply omitted, as examples. On a third training iteration, a second joint of the m joints may be masked, and so on, until each of the m joints are masked and only spatial information for the n joints is provided to the machine learning model. In general, on each successive training iteration, one or more of the m joints may be masked. For example, on some training iterations, more than one new joints of the m joints may be masked. Similarly, on some training iterations, no new joints of the m joints may be masked, and/or one or more of the m joints that were previously masked may no longer be masked.

This process is schematically illustrated with respect to FIGS. 5A-5D. Specifically, in FIG. 5A, a training input data set is provided to a machine learning model 400. In this example, the training input data includes spatial information corresponding to a plurality of different poses of the articulated object, including a first pose 502A and a second pose 502B. It will be understood that the specific poses shown in FIGS. 5A-5D are non-limiting, and that the training input data set may include training data corresponding to any suitable number of different poses of the articulated object, including only one pose.

For the sake of illustration, the different poses represented in the training input data are shown as if applied to a simplified representation of a human body. It will be understood, however, that the training input data may be expressed in any suitable form, and typically will not be rendered as if applied to a graphical representation of the articulated object.

Figure 5A:
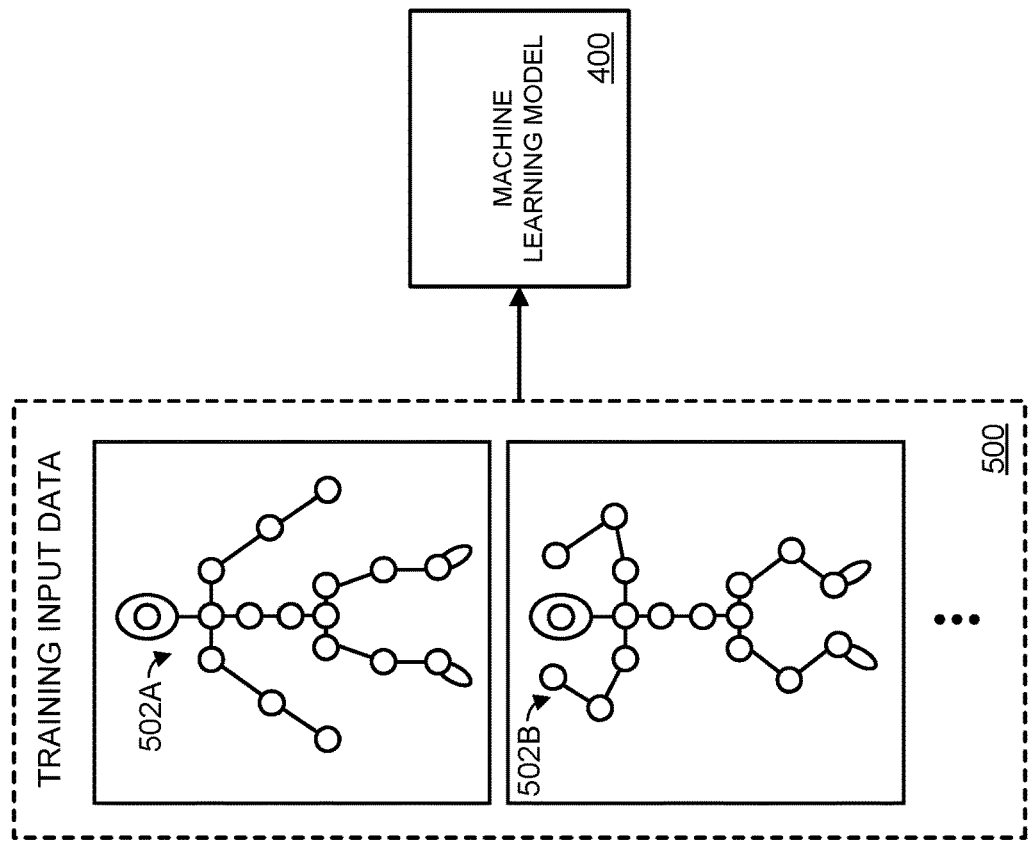
FIGS. 5A-5D schematically illustrate training a machine learning model over a plurality of training iterations.
Figure 5B:
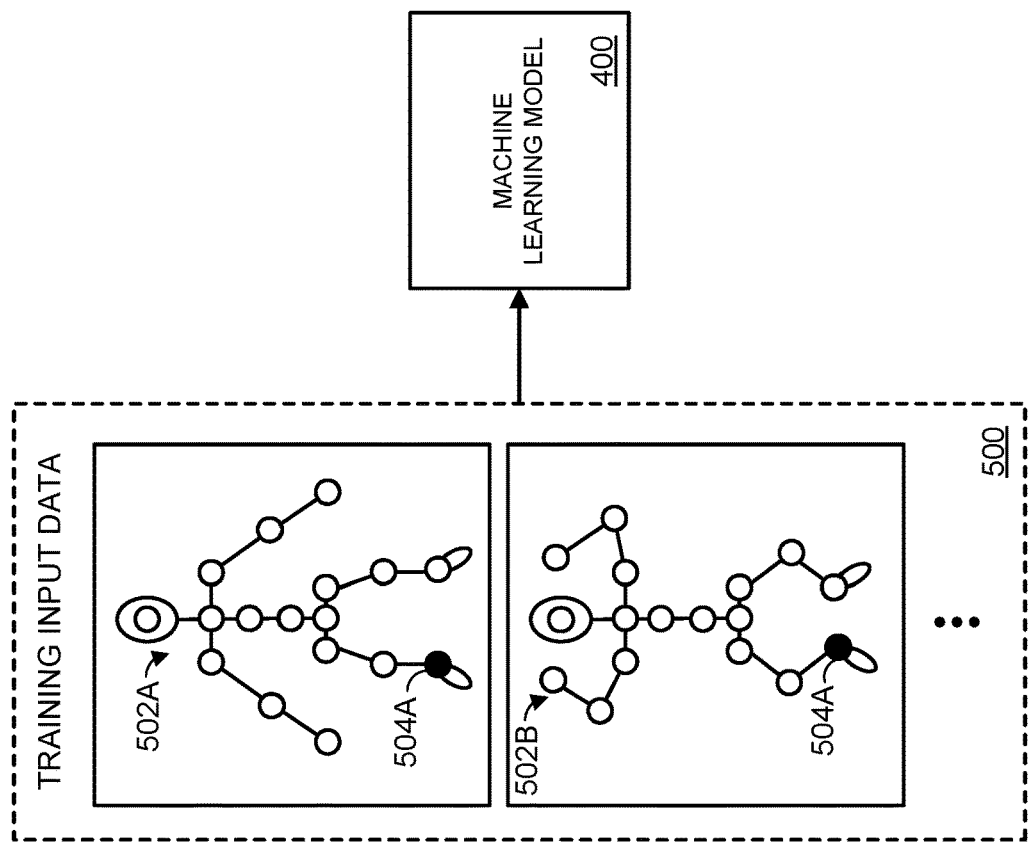
Figure 5D:
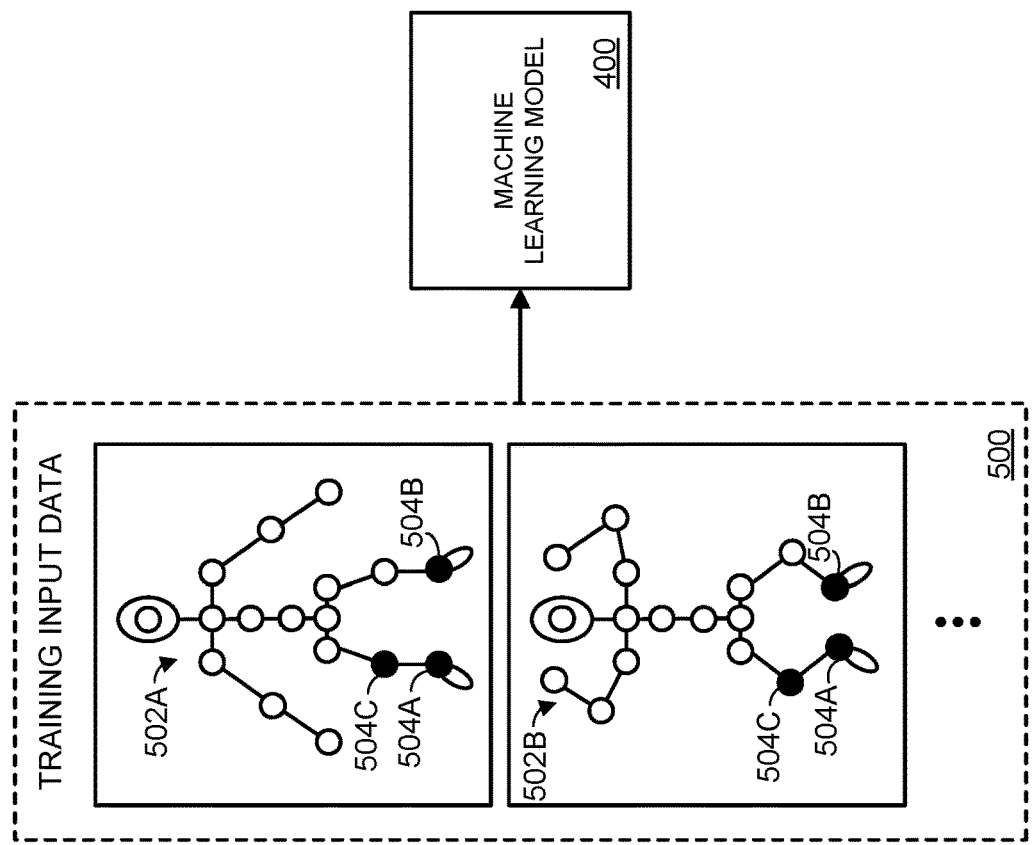

In FIG. 5A, spatial information for each of the n+m joints of the articulated object is provided to the machine learning model. This is indicated by the white fill pattern used for each of the circles representing joints in the simplified representation of the human body. However, in FIG. 5B, one of the joints 504A is masked, as indicated by the black fill pattern used for the circle representing joint 504A. In other words, FIG. 5A may represent a first training iteration of the training process, where spatial information for all of the n+m joints is provided to the machine learning model. FIG. 5B may represent a second training iteration of the training process, where a first joint 504A of the m joints is masked. It will be understood that the "second" training iteration need not be consecutive to the first training iteration—rather, spatial information for the n+m joints may be provided to the model for multiple consecutive training iterations before any joints are masked.

Figure 5C:
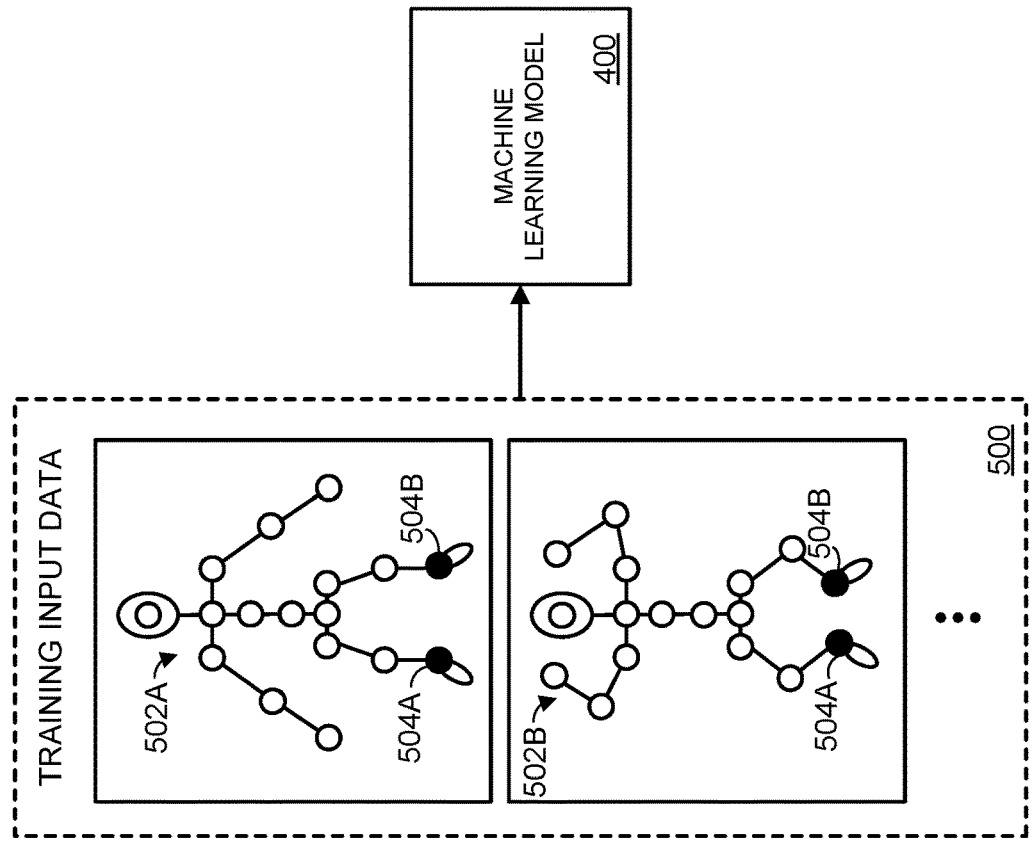

In FIG. 5C, a second joint 504B of the m joints of the articulated representation is masked. Similarly, in FIG. 5D, a third joint of the m joints is masked. As discussed above, this may continue for a plurality of training iterations until the spatial information for each of the m joints is masked, and only the spatial information for the n joints is provided to the machine learning model.

Any suitable criteria may be used for selecting which joints of the m joints should be masked for a given training iteration. In one example, progressively masking the training input data for each of the m joints includes, on each training iteration, masking a next joint of the m joints along a kinematic tree of the articulated object toward a root of the kinematic tree. For example, the root of the kinematic tree may be the pelvis. Thus, over the course of the training iterations, spatial information for the m joints may be masked starting at the extremities (e.g., the feet), and moving toward the pelvis (e.g., lower body joints, then arm joints, then spinal joints). In another approach, masking may begin at the root of the kinematic tree, then move toward the extremities.

In another example approach, progressively masking the training input data for each of the m joints includes, on each training iteration, randomly selecting one of the m joints for masking. In general, the spatial information for the m joints may be masked in any suitable order over the plurality of training iterations, and this order may be determined in any suitable way depending on the implementation.

Furthermore, in the example of FIGS. 5A-5D, multiple different poses of the articulated object are represented in the training input data. In such cases, progressively masking the training input data for each of the m joints includes, on each training iteration, masking a same joint of the m joints for each of the plurality of different poses. This is illustrated in FIGS. 5A-5D, in which the same joints are masked for each of poses 502A and 502B. In other examples, however, this need not always be the case. Rather, between the different poses represented in the training input data, different joints of the m joints may be masked, and/or a different number of joints may be masked, on the same training iteration.

One example approach for training and operation of a suitable machine learning model will now be described, where the machine learning model implements normalizing flows, and where the articulated object is the body of a human subject. Normalizing flows as likelihood-based generative models can provide a path to an expressive probability distribution of data. Notably, normalizing flows may only require a definition of a simple base distribution (also referred to as a prior) and a series of bijective transformations. These bijective transformations can allow the model to map the data to the latent space and vice versa.

Given input data $x \in R$, the goal is to learn the joint distribution of data. Normalizing flows model x as a transformation T of a real vector $z \in R$ sampled from the chosen base distribution pz(z), which may be as simple as a multivariate normal distribution. With invertible and differentiable T (and hence T−1), and using a change of variable formula, the density of x may be obtained as:

$$p_x(x) = p_z(z)|\det J_T(z)|^{-1}$$

where $J_T$ is the Jacobian of T. Since $z=T^{-1}(x)$, $p_x(x)$ can also be written in terms of x and the Jacobian of $T^{-1}$:

$$p_x(x) = p_z(T^{-1}(x))|\det J_{T^{-1}}(x)|$$

Instead of one transformation, multiple simple transforms can be composed to form a complex transform $T = T_K^\circ T_{K-1}^\circ \ldots ^\circ T_1$, where $T_i$ transforms $z_{i-1}$ into $z_i$, $z_0$ is the latent variable in the base distribution, and $x = z_K$. This composition can be built with neural networks that maximize the data log-likelihood. log p(x) can be written as:

$$\log p(x) = \log p(z_0) - \sum_{i=1}^{K} \log\det\left|\frac{\partial T_i}{\partial z_i}\right|$$

SMPL can be described as a parametric generative model of human body meshes. SMPL may receive as input the 3D human poses in axis-angle representation θ and the body shape parameters β, and generate the body mesh represented as 3×6890 matrix M=SMPL(θ,β). With that, SMPL(θ,β)H can be defined to compute the position and/or orientation for the head and hands.

The goal of the pose prediction process may be defined as generating a full body pose $x_\theta$ given a sparse observation xx and the shape parameters β. $x_\theta \in R^{3 \times J}$ represents joint rotations as axis-angle vectors for J body joints, and $x_H \in R^{9 \times K}$ represents the global 6D joint rotation and a 3D joint location for each of the K=3 observations (e.g., head and hands). This information can be obtained from a parametric model of the human body—e.g., SMPL.

One valid way to generate $x_\theta$ from $x_H$ is to learn the distribution of the body pose given the observed $x_H$ and β via a conditional flow-based model $f_\theta$. While this approach can effectively provide the likelihood of a given pose, the generation process remains incomplete; for generating a novel pose given $x_H$ and β, it may be necessary to sample a latent variable. However, the sampling process may notably be independent of the observations. While other approaches rely on the mean of the latent space z=0 (a vector of all zeros) as the latent code to generate the full pose, the present disclosure contemplates a latent code that represents $x_\theta$ better than z=0. In fact, while z=0 may be the most likely latent code in the base distribution, it may not necessarily translate to the most likely pose in the pose space, as there can be changes in the volume of the distribution through transformations of $f_\theta$. To obtain such a latent code, the system may estimate a sub-region in the normalizing flow base distribution, $N(\mu_H, \Sigma_H)$, given $x_H$ and β, from which a latent variable can be sampled to generate the full body pose.

At test time, to generate a full body pose given $x_H$ and β, a latent code may be sampled from $z_H \sim N(\mu_H, \Sigma_H)$ and used as an approximation of $z_\theta$, the latent code that generates a full body pose. This latent estimate can be used to generate a full body pose via $\hat{x}_\theta = f_\theta(z_H, [x_H, \beta])$.

The distribution of $x_\theta$ can be modeled with a normalizing flow model. The model $f_\theta$ is a conditional RealNVP conditioned on $x_H$ and β. This can be achieved by mapping $x_\theta$ from the pose distribution to the base distribution (and vice versa) via a composition of simple invertible transformations, where each transformation can stretch or shrink its input distribution. In other words, the machine learning model may include a normalizing flow that applies a plurality of invertible transforms to the spatial information for the n joints to output the pose prediction.

Figure 6:
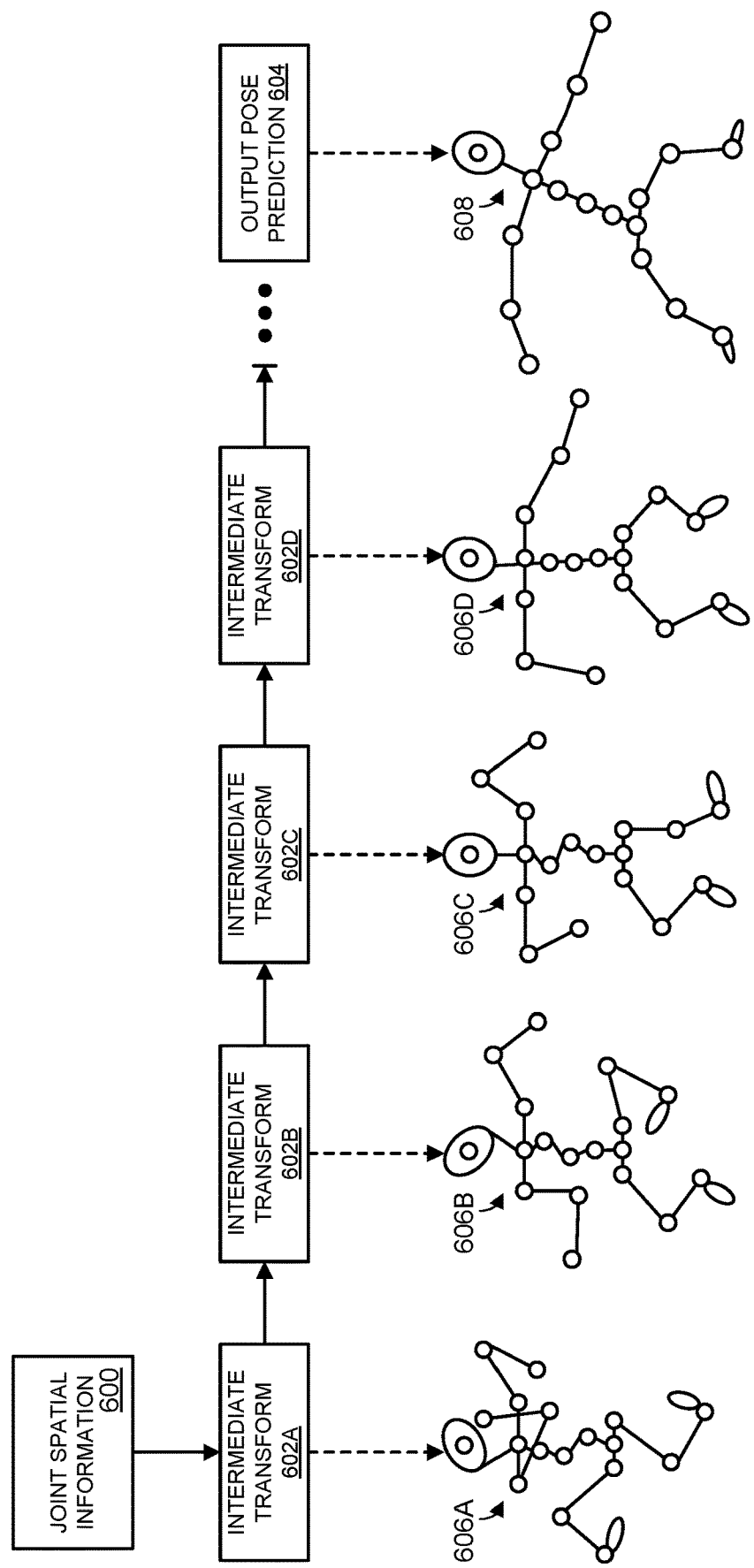
FIG. 6 schematically illustrates applying a plurality of intermediate transforms to output a pose prediction for an articulated object.

This is schematically illustrated with respect to FIG. 6. Specifically, FIG. 6 illustrates a set of joint spatial information 600, to which a series of intermediate transforms 602A-602D is applied, eventually resulting in an output pose prediction 604. For the sake of illustration, the resulting output pose 606A-606D of each intermediate transform is shown as if applied to a simplified representation of a human body.

However, it will be understood that the process illustrated in FIG. 6 is highly simplified for the sake of example. It will be understood that any suitable number of intermediate transforms may be applied to the joint spatial information, and that various steps of the pose prediction process are omitted. Furthermore, it will be understood that the output of each transform operation need not be applied to a graphical representation of the articulated object as is shown in FIG. 6, but rather this is done only to illustrate the cumulative incremental effects of each intermediate transform.

In cases where a plurality of invertible transforms are applied to the spatial information for the n joints, in some cases intermediate supervision may be used during training to affect the contribution of one or more of the invertible transforms. This may be used to address a scenario where the largest contributors to outputting an accurate pose prediction for the articulated object are the last invertible transforms in the sequence. In other words, previously training the machine learning model may include applying intermediate supervision by supplying a ground-truth pose of the articulated object to one or more intermediate invertible transforms of the plurality of invertible transforms. Thus, in addition to having the ground truth pose as the input to the last transformation block, the ground truth pose can be input to the intermediate transformation blocks, as if they are the last block of a sub-network. This is possible because the transformations in $f_\theta$ do not modify the data dimension. As a result, intermediate transformation blocks may be encouraged to produce reasonable human poses and their capacity is exercised fully. This may have the effect of increasing the contribution of the intermediate invertible transforms to ultimately outputting an accurate pose prediction for the articulated object.

To generate a novel pose given $x_H$ and β, a latent variable z may be sampled from the base distribution and used to generate a pose $\hat{x}_\theta = f_\theta(z, [x_H, \beta])$. Since an oracle latent code is known during training, the model may be trained such that it learns to map the condition ($x_H$ and β) into a region in the base distribution where z* has a high likelihood. Utilizing z* during training allows changes in the volume of the base distribution to be considered, and thus the changes in the probability mass around the latent code, when transformed from the base distribution to the pose space via $f_\theta$. The region of interest can be modeled with a Gaussian to learn its parameters $\mu_H$ and $\Sigma_H = \text{diag}(\sigma_H)^2$.

Such a mapping may have two desirable properties: (i) The mapping may be expressive, such that it can produce a representation of full body given the sparse observations. This may be used to estimate a sub-region of the base distribution that represents the full body. (ii) The mapping may account for uncertainty in human body representation given sparse observation. When only the head and hands are observed, there exist multiple plausible full-body poses. For each plausible pose, the corresponding sub-region in the base distribution may be determined.

To this end, a transformer-based model (with a transformer encoder) may be used to model the mapping function, taking advantage of the self-attention mechanism that learns the relationships between different joints in the body during training. Briefly, the transformer encoder may receive as input $x_H$ and $\beta$, and estimate $N(\mu_H, \Sigma_H)$, wherein $\mu_H$ is trained to be a good approximation of the oracle latent code $z^*$.

For such a distribution to be representative of the full body, $x_\theta$ may be generated from the output of the transformer encoder, initially aiming to reconstruct $x_\theta$ from full body joints and gradually decreasing the joint visibility (through masking) in the encoding until only the head and hands are provided, as discussed above. To further help the transformer learn the representation of the body, the masked joints may be predicted given the observed joints. Such gradual masking-and-prediction may enable the model to infer the full body representation through attention (layer) on the available joints in the input. To get a compact representation out of the transformer encoder, a pooling ($Pool_H$) may be applied over output joints, taking only the unmasked joints (e.g., the head and hand representations).

The output of the transformer encoder in some cases may be deterministic—e.g., the encoder does not give uncertainty estimates for the predicted poses. Therefore, a categorical latent space [13,30,33] may be modeled over human poses from the output of the transformer encoder. A discrete latent variable from this distribution may be sampled to generate $x_\theta$ with the defined auxiliary task, or use the entire latent representation to estimate $N(\mu_H, \Sigma_H)$, which includes information about a plausible pose and the associated uncertainty. To efficiently model the complex distribution of human motion, a relatively large latent space may be used, leading to a relatively large number of latent categories. To remedy this, a 2D categorical latent space may be used. In particular, a G-dimensional latent variable may be modeled, each responsible for M modes. This provides for the capacity to use $M^G$ one-hot latent codes.

The training dataset may include diverse 3D human models, where each sample is a triplet $(x_\theta, x_H, \beta)$, and where $\beta$ are the SMPL shape parameters. The loss function L is given by $$L = \lambda_{nll} L_{nll} + \lambda_{mjp} L_{mjp} + \lambda_{rec} L_{rec} + \lambda_{lra} L_{lra}$$

where $\lambda$s are the weights associated with each term.

$L_{nll}$: This term encourages the model to minimize the negative log-likelihood of $x_\theta$ under the model $f_\theta$. Additionally, the log-likelihoods produced by the sub-networks of $f_\theta$ as the result of intermediate supervision may be accounted for.

$$\mathcal{L}_{nll} = -\left(\log p_\theta(x_\theta) + \sum_{s \in S} w_s \log p_\theta^s(x_\theta)\right)$$

where S is the set of sub-networks of $f_\theta$ (e.g., from block $T_i$ to $T_1$ for a pre-defined set of is), $p^s_\theta(x_\theta)$ is the log-likelihood of $x_\theta$ under sub-network s, and $w_s$ is the weight associated to the sub-network that is proportional to the number of transformation blocks in each sub-network.

$L_{mjp}$: To train the auxiliary task of masked joint prediction, the following function may be used:

$$\mathcal{L}_{mjp} = \sum_{j \in J_{masked}} \|x_P^j - \hat{x}_P^j\|_2^2$$

where $J_{masked}$ is the list of masked joints, $x^j_P$ is the representation of the $j^{th}$ joint in $R^9$ (6D rotation and 3D location), and $\hat{x}^j_P$ is the corresponding prediction from the network.

$L_{rec}$: This term acts on the output of the auxiliary task of decoding the full body pose from a discrete latent variable sampled transformer's categorical latent space, aiming to guide to build a meaningful discrete latent space:

$$\mathcal{L}_{rec} = \|\hat{x}_\theta^{lps} - x_\theta\|_2^2$$

$L_{lra}$: This term encourages learning a Gaussian distribution $N(\mu_H, \Sigma_H)$ under which the oracle latent variable $z^*$ has high likelihood:

$$L_{lra} = -\alpha_{nll} \log_{(1+\ln \Sigma_H - \Sigma_H)} p_H(z^*) + \alpha_{rec} \|\mu H - z^*\|_2^2 - \alpha_{reg}$$

where $p_H$ is the estimated sub-region of the base distribution.

Although the entire model can be trained in an end-to-end fashion, it may be effective to train $f_\theta$ first, followed by training the latent region approximator. The second training stage may be relatively fast,—e.g., on the order of 4 GPU-hours. This two-stage training may also be useful in cases where it is desirable to use a previously trained $f_\theta$ as a foundation model, and only train mapping functions for other data modalities, e.g., body markers or environment scans.

A full body pose may be generated given $x_H$ and $\beta$ by first computing $\mu_H$ given the observation, then using $\mu_H$ as an approximation of $z_\theta$ to generate a pose $x^\hat{}_\theta = f_\theta(\mu_H, [x_H, \beta])$. To further enhance the quality of the generated pose, the flow-based model may be used as a pose prior in optimization to minimize a cost function over the prior and the data. The optimization can be done either in pose space or in latent space.

The optimizer seeks a plausible human pose $\theta$ under that matches the observation $x_H$. It is possible to optimize for $\theta$ by minimizing the cost:

$$C(\theta) = -\log p_\theta(x_\theta) + \|SMPL(\theta, \beta)[H] - x_H\|^2$$

The optimizer seeks a latent variable z that leads to a plausible pose under the model that matches the observation xx. Using generative functionality of the pose prior ($f_\theta$) to generate a pose, it is possible to optimize for z by minimizing the cost:

$$C(z) = -\log p(z) + \|SMPL(\theta, \beta^\hat{})[H] - x_H\|^2 + r$$

where log p(z) is the log-likelihood of the optimized z under the base distribution:

$$N(0,I), \theta^\hat{} = f_\theta(z, [x_H, \beta])$$

and $r = \|z - \mu_H\|$ is a regularizer to implicitly prevent the latent code from straying too far from the initial guess.

The present disclosure has primarily focused on scenarios where the articulated object is the full body of a human subject. As discussed above, however, this is not limiting. Rather, in other examples, the articulated object may take the form of a substituent part of a human body, a non-human animal, or an inanimate object such as a machine.

Figure 7:
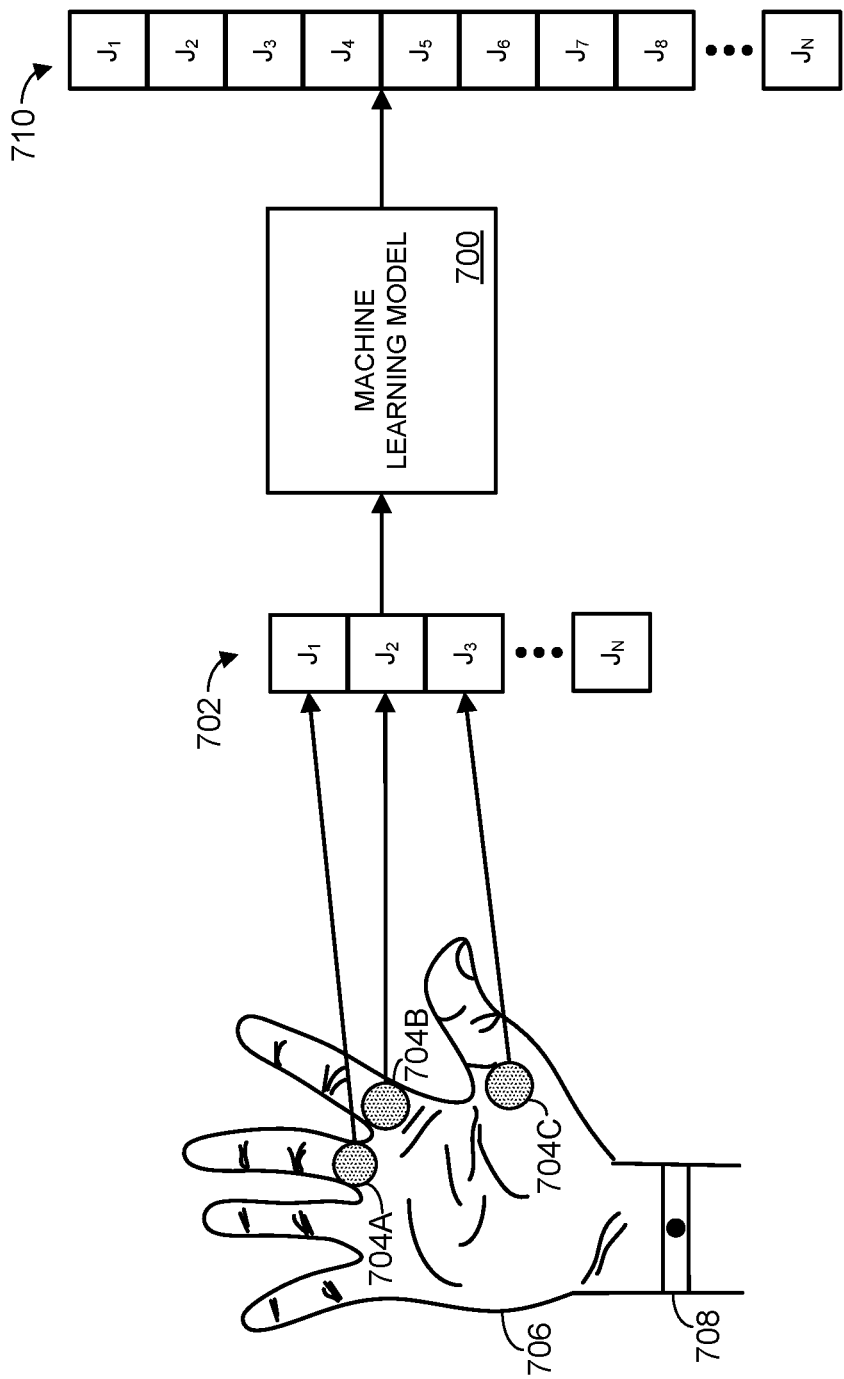
FIG. 7 schematically illustrates a machine learning model outputting a predicted pose for another example articulated object based on spatial information.

To this end, FIG. 7 schematically illustrates an example scenario where the articulated object is a human hand, rather than an entire human body. Specifically, FIG. 7 shows an example machine learning model 700, which may be implemented as described above. Machine learning model 700 receives spatial information for joints $J_1$, $J_2$, and $J_3$, which correspond to three joints 704A-C of an articulated object, in this case taking the form of a human hand 706. Specifically, in this case the n joints include one or more finger joints of the human hand. The spatial information for the one or more finger joints details parameters for one or more fingers or finger segments of the human hands. For example, the spatial information may specify positions/orientations of fingers of the hand, and/or rotations applied to joints of the hand.

Spatial information for the joints may be collected in any suitable way—e.g., via a position sensor 708. As one example, the position sensor may take the form of a camera configured to image the human hand. As another example, the position sensor may include suitable radio-frequency antennas configured to expose the surface of the human hand to an e-field, and assess how the impedance of the e-field at the antennas is affected by movements and proximity of conductive human skin.

Based on the input spatial information 702, the machine learning model outputs a set of predicted spatial information 710, which may constitute a predicted pose of the articulated object. As discussed above, such spatial information may be expressed as the positions/orientations of body parts of the articulated object (e.g., fingers or finger segments), as one or more rotations applied to joints of the articulated object, and/or in another suitable way.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
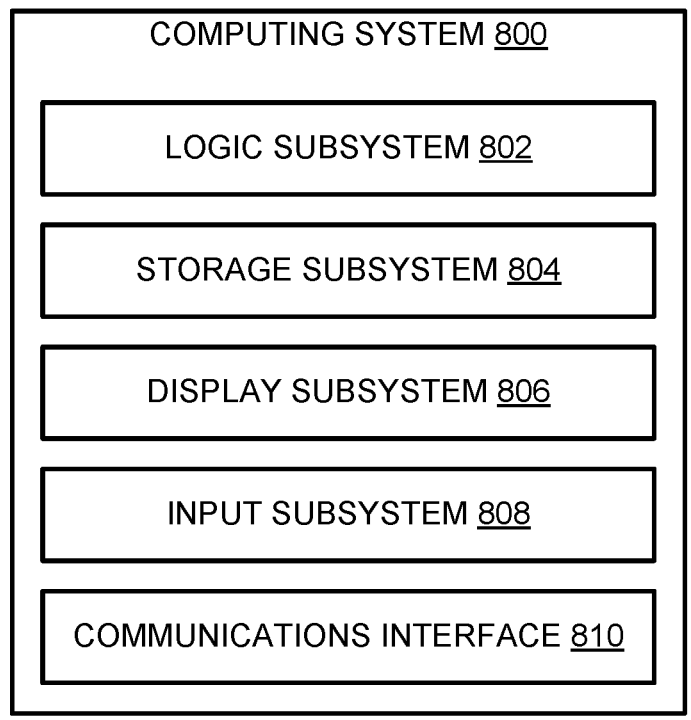
FIG. 8 schematically shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for predicting the pose of an articulated object comprises: receiving spatial information for n joints of the articulated object; passing the spatial information for the n joints to a machine learning model previously trained to receive spatial information for n+m joints as input, wherein m>=1; and receiving as output from the machine learning model a pose prediction for the articulated object based at least on the spatial information for the n joints, and without spatial information for the m joints. In this example or any other example, the articulated object is a human body. In this example or any other example, the n joints include a head joint of the human body, and the spatial information for the head joint details parameters for a head of the human body. In this example or any other example, the n joints include one or more wrist joints of the human body, and the spatial information for the one or more wrist joints details parameters for one or more corresponding hands of the human body. In this example or any other example, the spatial information for the n joints of the articulated object is derived from positioning data output by one or more sensors. In this example or any other example, the one or more sensors include one or both of a camera configured to image the one or more body parts of the human body, and a position sensor configured to be held by or worn by at least one body part of the human body. In this example or any other example, the articulated object is a human hand. In this example or any other example, the n joints include one or more finger joints of the human hand, and the spatial information for the one or more finger joints details parameters for one or more fingers or finger segments of the human hand. In this example or any other example, the machine learning model is previously trained with training input data having ground truth labels for the articulated object. In this example or any other example, previously training the machine learning model includes, for a first training iteration, providing training input data for all n+m joints to the machine learning model, and over a series of subsequent training iterations, progressively masking the training input data for one or more of the m joints. In this example or any other example, progressively masking the training input data for each of the m joints includes, on each training iteration, masking one or more next joints of the m joints along a kinematic tree of the articulated object toward a root of the kinematic tree. In this example or any other example, progressively masking the training input data for each of the m joints includes, on each training iteration, randomly selecting one or more of the m joints for masking. In this example or any other example, the training input data includes spatial information corresponding to a plurality of different poses of the articulated object, and wherein progressively masking the training input data for the one or more m joints includes, on each training iteration, masking a same joint of the m joints for each of the plurality of different poses. In this example or any other example, the machine learning model includes a normalizing flow that applies a plurality of invertible transforms to the spatial information for the n joints to output the pose prediction. In this example or any other example, previously training the machine learning model includes applying intermediate supervision by supplying a ground-truth pose of the articulated object to one or more intermediate invertible transforms of the plurality of invertible transforms. In this example or any other example, the pose prediction includes predicted spatial information for all n+m joints of the articulated object.

In an example, a computing system comprises: a logic subsystem; and a storage subsystem holding instructions executable by the logic subsystem to: receive spatial information for n joints of the articulated object; pass the spatial information for the n joints to a machine learning model previously trained to receive spatial information for n+m joints as input, wherein m>=1; and receive as output from the machine learning model a pose prediction for the articulated object based at least on the spatial information for the n joints, and without spatial information for the m joints. In this example or any other example, the articulated object is a human body, and wherein the n joints include a head joint of the human body and one or more wrist joints of the human body. In this example or any other example, previously training the machine learning model includes, for a first training iteration, providing training input data for all n+m joints to the machine learning model, and over a series of subsequent training iterations, progressively masking the training input data for each of the m joints.

In an example, a method for predicting the pose of a human body comprises: receiving spatial information for n joints of the human body, the n joints including a head joint of the human body and one or more wrist joints of the human body; passing the spatial information for the n joints to a machine learning model previously trained to receive spatial information for n+m joints as input, wherein m>=1, the machine learning model previously trained by, for a first training iteration, providing training input data for all n+m joints to the machine learning model, and over a series of subsequent training iterations, progressively masking the training input data for each of the m joints; and receiving as output from the machine learning model a pose prediction for the human body based at least on the spatial information for the n joints, and without spatial information for the m joints.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for predicting the pose of an articulated object, comprising:
receiving spatial information for n joints of the articulated object;
passing the spatial information for the n joints to a machine learning model previously trained to receive spatial information for n+m joints as input, wherein m>=1, and wherein previously training the machine learning model includes providing training input data to the machine learning model for a quantity of joints that is greater than n, and over a series of training iterations, progressively reducing the quantity of joints; and receiving as output from the machine learning model a pose prediction for the articulated object based at least on the spatial information for the n joints, and without spatial information for the m joints.

2. The method of claim 1, wherein the articulated object is a human body.

3. The method of claim 2, wherein the n joints include a head joint of the human body, and the spatial information for the head joint details parameters for a head of the human body.

4. The method of claim 3, wherein the n joints include one or more wrist joints of the human body, and the spatial information for the one or more wrist joints details parameters for one or more corresponding hands of the human body.

5. The method of claim 2, wherein the spatial information for the n joints of the articulated object is derived from positioning data output by one or more sensors.

6. The method of claim 5, wherein the one or more sensors include one or both of a camera configured to image the one or more body parts of the human body, and a position sensor configured to be held by or worn by at least one body part of the human body.

7. The method of claim 1, wherein the articulated object is a human hand.

8. The method of claim 7, wherein the n joints include one or more finger joints of the human hand, and the spatial information for the one or more finger joints details parameters for one or more fingers or finger segments of the human hand.

9. The method of claim 1, wherein the machine learning model is previously trained with training input data having ground truth labels for the articulated object.

10. The method of claim 1, wherein previously training the machine learning model includes, for a first training iteration, providing training input data for all n+m joints to the machine learning model, and over a series of subsequent training iterations, progressively masking the training input data for one or more of the m joints.

11. The method of claim 10, wherein progressively masking the training input data for each of the m joints includes, on each training iteration, masking one or more next joints of the m joints along a kinematic tree of the articulated object toward a root of the kinematic tree.

12. The method of claim 10, wherein progressively masking the training input data for each of the m joints includes, on each training iteration, randomly selecting one or more of the m joints for masking.

13. The method of claim 10, wherein the training input data includes spatial information corresponding to a plurality of different poses of the articulated object, and wherein progressively masking the training input data for the one or more m joints includes, on each training iteration, masking a same joint of the m joints for each of the plurality of different poses.

14. The method of claim 1, wherein the machine learning model includes a normalizing flow that applies a plurality of invertible transforms to the spatial information for the n joints to output the pose prediction.

15. The method of claim 14, wherein previously training the machine learning model includes applying intermediate supervision by supplying a ground-truth pose of the articulated object to one or more intermediate invertible transforms of the plurality of invertible transforms.

16. The method of claim 1, wherein the pose prediction includes predicted spatial information for all n+m joints of the articulated object.

17. A computing system, comprising:
a logic subsystem; and
a storage subsystem holding instructions executable by the logic subsystem to:
receive spatial information for n joints of the articulated object;
pass the spatial information for the n joints to a machine learning model previously trained to receive spatial information for n+m joints as input, wherein m>=1, and wherein previously training the machine learning model includes providing training input data to the machine learning model for a quantity of joints that is greater than n, and over a series of training iterations, progressively reducing the quantity of joints; and
receive as output from the machine learning model a pose prediction for the articulated object based at least on the spatial information for the n joints, and without spatial information for the m joints.

18. The computing system of claim 17, wherein the articulated object is a human body, and wherein the n joints include a head joint of the human body and one or more wrist joints of the human body.

19. The computing system of claim 17, wherein previously training the machine learning model includes, for a first training iteration, providing training input data for all n+m joints to the machine learning model, and over a series of subsequent training iterations, progressively masking the training input data for each of the m joints.

20. A method for predicting the pose of a human body, comprising:
receiving spatial information for n joints of the human body, the n joints including a head joint of the human body and one or more wrist joints of the human body;
passing the spatial information for the n joints to a machine learning model previously trained to receive spatial information for n+m joints as input, wherein m>=1, the machine learning model previously trained by, for a first training iteration, providing training input data for all n+m joints to the machine learning model, and over a series of subsequent training iterations, progressively masking the training input data for each of the m joints; and
receiving as output from the machine learning model a pose prediction for the human body based at least on the spatial information for the n joints, and without spatial information for the m joints.

* * * * *